(12) United States Patent
Chang-Fa

(10) Patent No.: US 6,489,994 B1
(45) Date of Patent: Dec. 3, 2002

(54) METHOD AND DEVICE FOR PROTECTING A CATHODE RAY TUBE IN AN IMAGE DISPLAYING DEVICE BY USING A BRIGHTNESS CONTROL CIRCUIT

(75) Inventor: Hsieh Chang-Fa, Ban-Chiao (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 09/534,539

(22) Filed: Mar. 27, 2000

(30) Foreign Application Priority Data

Jan. 4, 1999 (TW) .......................................... 88105226 A

(51) Int. Cl.$^7$ .............................. H04N 5/68; H04N 9/16
(52) U.S. Cl. ......................................... 348/380; 348/805
(58) Field of Search ................................ 348/380, 805, 348/739, 687; H04N 5/68, 9/16

(56) References Cited

U.S. PATENT DOCUMENTS 5,313,294 A * 5/1994 Haferl ........................ 348/380

* cited by examiner

Primary Examiner—Sherrie Hsia
(74) Attorney, Agent, or Firm—Winston Hsu

(57) ABSTRACT

A method and device utilizes a brightness control circuit for protecting a cathode ray tube in an image displaying device. The displaying device has an image signal amplifier, a cathode ray tube, and a brightness control circuit. The cathode ray tube has a screen, an electron gun, and an anode for collecting an electron beam emitted onto the screen to produce an anode current. The brightness control circuit is electrically connected to a control end of the image signal amplifier for controlling the amplification magnitude of the image signal amplifier and electrically connected with the anode of the cathode ray tube via a flyback transformer, wherein when the incoming image signals make the image picture shown on the screen too bright, the anode current of the anode will be increased accordingly, and the brightness control circuit will reduce the amplification magnitude of the image signal amplifier at the same time according to the increase of the anode current so as to reduce the anode current. The brightness control circuit comprises an adjusting circuit electrically connected with the control end of the image signal amplifier for adjusting the brightness of the image picture of the screen.

13 Claims, 2 Drawing Sheets

METHOD AND DEVICE FOR PROTECTING A CATHODE RAY TUBE IN AN IMAGE DISPLAYING DEVICE BY USING A BRIGHTNESS CONTROL CIRCUIT

BACKGROUND OF THE INVENTION

1. Field of the Invention

The present invention relates to a method and device for protecting an image displaying device, and more particularly, to a method and device for protecting a cathode ray tube in an image displaying device by using a brightness control circuit.

2. Description of the Prior Art

Many TV sets and computer displays use a cathode ray tube as the main displaying element. The cathode ray tube of the prior art comprises a screen, an electron gun, and an anode. The electron gun comprises a cathode capable of emitting electrons, and a cylinder electrode capable of concentrating the electrons together and then accelerating them to be focused on the screen. The electron flow from the electron gun is controlled by image control signals and is projected onto a fluorescent screen to create images. The electron flow emitted by the electron gun gathers at the anode of the cathode ray tube to form an anode current. The magnitude of the anode current reflects the magnitude of electron flow emitted by the electron gun. The fluorescent screen of the cathode ray tube is coated with fluorescent material, and thus will illuminate when hit by the electrons emitted by the electron gun. If the image is too bright, the quantity of electrons hitting the fluorescent screen within a short period of time will be high. This may lead to early degradation of the fluorescent material coating and a reduced cathode ray tube lifespan. Displaying devices using cathode ray tubes are usually equipped with an automatic brightness limiting circuit (ABL circuit) for this purpose. When the average brightness exceeds a predetermined value, the ABL circuit will automatically be activated to prevent burning out of the fluorescent material as well as protecting other circuits from harm.

SUMMARY OF THE INVENTION

It is therefore a primary objective of the present invention to provide a method and device for protecting a cathode ray tube in an image displaying device by using a brightness control circuit as a new ABL circuit to solve the above mentioned problem.

In a preferred embodiment, the present invention provides a displaying device and a method for adjusting the brightness of a displaying device, the displaying device comprising:

an image signal amplifier for amplifying incoming image signals;

a cathode ray tube comprising a screen at its front end, an electron gun at its rear end for projecting and controlling an electron beam according to the amplified image signals onto the screen to create an image picture, and an anode for collecting the electron beam emitted onto the screen to produce an anode current; and a brightness control circuit electrically connected to a control end of the image signal amplifier for controlling the amplification magnitude of the image signal amplifier and electrically connected with the anode of the cathode ray tube via a flyback transformer which is used for providing the anode with the anode current wherein when the incoming image signals make the image picture shown on the screen too bright, the anode current of the anode will be increased accordingly, and the brightness control circuit will reduce the amplification magnitude of the image signal amplifier at the same time according to the increase of the anode current so as to reduce the anode current, and wherein the brightness control circuit comprises an adjusting circuit electrically connected with the control end of the image signal amplifier for adjusting the brightness of the image picture of the screen;

the method comprising:

using a brightness detector to detect the brightness of the image picture of the screen, and using the adjusting circuit to adjust the brightness of the image picture until the brightness detected by the brightness detector reaches a predetermined brightness value.

It is an advantage of the present invention that a brightness control circuit adjusts the relationship between the anode current and the amplification magnitude of the image signals. When the image signals from the computer are such that the brightness of the image screen is too great, the anode current of the cathode ray tube increases. The brightness control circuit 16 then detects this change and sends a signal to reduce the amplification magnitude of the image signal amplifier. This protects the screen 18 from an electron beam that is too strong, thus maintains its useful life as well as protecting other circuits from damage caused by excessive average anode current.

This and other objectives of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
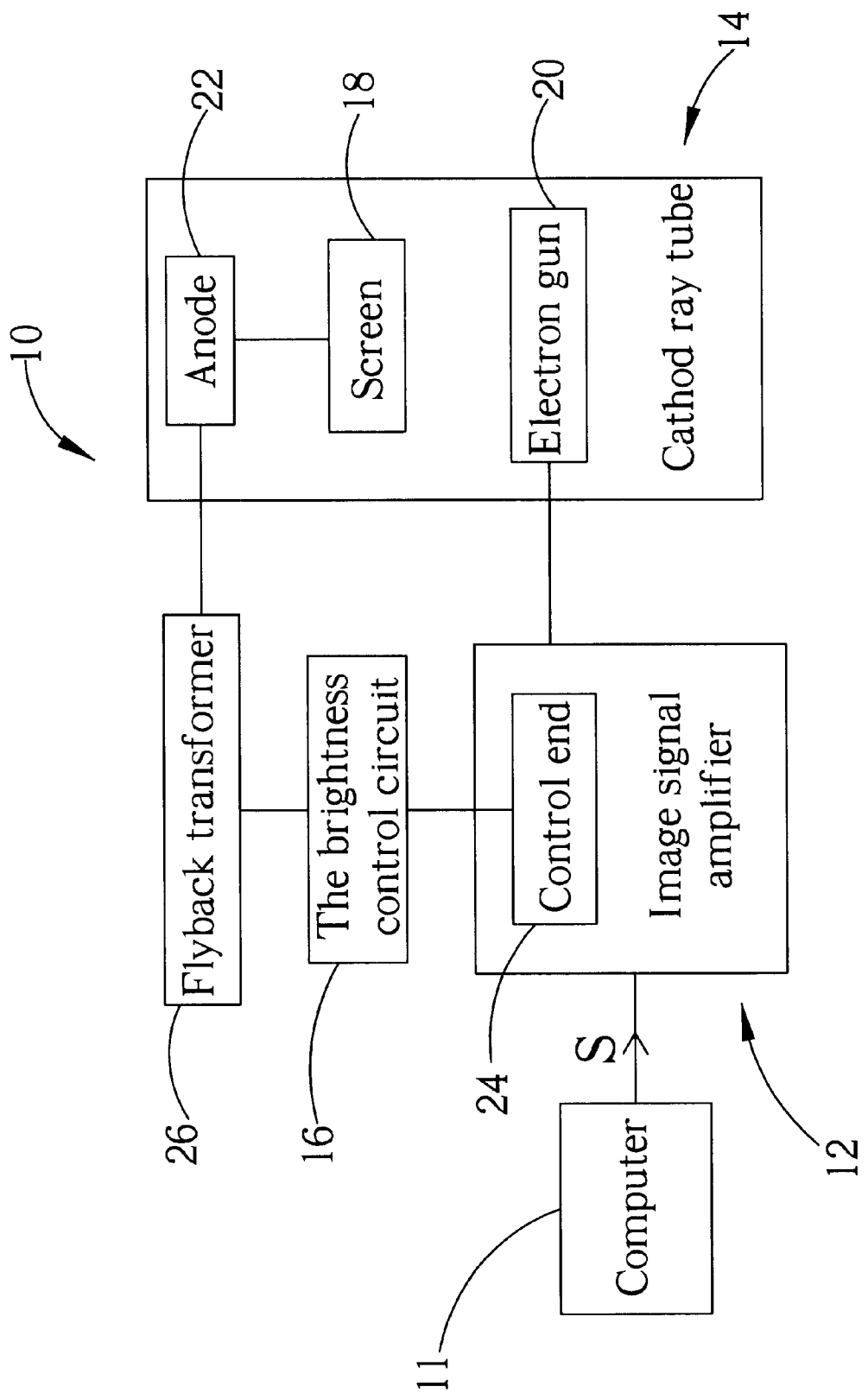
FIG. 1 is a functional block diagram of the displaying device according to the present invention.

Please refer to FIG. 1. FIG. 1 is a functional block diagram of the displaying device 10 according to the present invention. The displaying device 10 of the present invention comprises an image signal amplifier 12, a cathode ray tube 14, a brightness control circuit (e.g., ABL circuit) 16. The image signal amplifier 12 receives incoming image signals (S) from the computer, then processes and amplifies them. The image signal amplifier 12 comprises a control end 24 for controlling the amplification magnitude of the image signals. A high input control voltage corresponds to a high amplification magnitude, and a low input control voltage corresponds to a low amplification magnitude. The cathode ray tube 14 comprises a screen 18 at its front end, an electron gun 20 at its rear end for projecting and controlling an electron beam according to the amplified image signals onto the screen to form the image, and an anode 22 for collecting the electron beam projected from the electron gun onto the screen to produce an anode current.

The brightness control circuit 16 shown in FIG. 1 is electrically connected to both the control end 24 of the image signal amplifier 12 to control the amplification magnitude of the image signal amplifier 12 as well as with the anode 22 of the cathode ray tube 14 via a flyback transformer 26 to provide and measure the magnitude of the anode current to the anode 22. If the image on the screen 18 is brighter, the anode current of the anode will be increased accordingly. If the image on the screen 18 is too bright, the anode current of the anode will exceed a predetermined value and thus the brightness control circuit will be activated to reduce the amplification magnitude of the image signal amplifier 12 in proportion to the increase of the anode current. This causes a reduction of the anode current to protect the screen from damage caused by the excessive electron beam.

Figure 2:
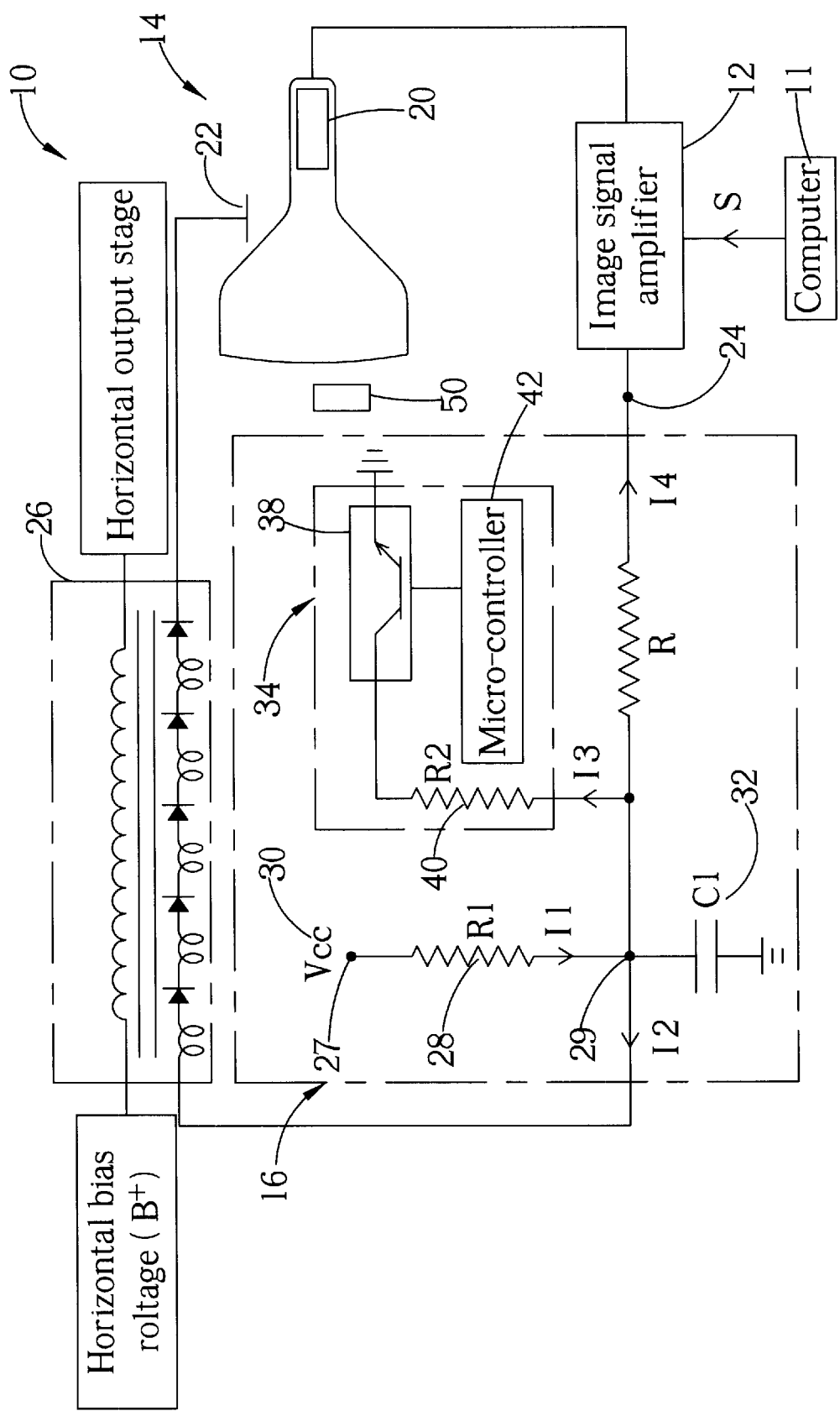
FIg. 2 is a schematic diagram of the displaying device shown in FIG. 1.

Please refer to FIG. 2. FIG. 2 is a schematic diagram of the displaying device 10 shown in FIG. 1. The brightness control circuit 16 comprises a first resistor (R1) 28 having a first end 27 and a second end 29, and a voltage source (Vcc) 30 electrically connected with the first end 27 of the first resistor. The flyback transformer 26 and the control end of the image signal amplifier 12 are electrically connected with the second end 29 of the first resistor 28. Since the control current $I_4$ of the image signal amplifier 12 is insignificant compared to $I_1$, $I_2$ and $I_3$, we may say $I_1$ is approximately equal to $I_2+I_3$, the voltage at end 24 is approximately equal to the voltage at end 29. Assuming $I_3$ is fixed, when the anode current $I_2$ of the anode is increased, $I_1$, which passes through the first resistor 28, also increases. Since Vcc is fixed, a voltage drop across this first resistor 28 causes the voltage at end 24 to be reduced. The amplification magnitude of the image signal amplifier 12 will be reduced accordingly.

The brightness control circuit 16 further comprises a noise filter 32 and an adjusting circuit 34. The noise filter is a capacitor (C1) electrically connected between the second end 29 of the first resistor and ground for filtering electric noise in the anode current. Thus the changes in voltage at the end 29 would reflect the average change in the anode current, instead of reflecting the short-term fluctuation in the anode current. The adjusting circuit 34 is electrically connected between the second end 29 of the first resistor and ground for adjusting the voltage at the second end 29 of the first resistor. The adjusting circuit 34 comprises a switch 38, a second resistor (R2) 40 connected in series between the second end 29 of the first resistor and the switch 38, and a micro-controller 42 for controlling the switch 38. The micro-controller 42 adjusts $I_3$ by using the pulse-width-modulation (PWM) method to control the duty cycle of the operation of the switch 38. $I_1$ is approximately equal to $I_2+I_3$, so when $I_2$ is fixed, $I_3$ increases in direct proportion to $I_1$ and the voltage of the end 29 decreases. Likewise, $I_3$ decreases in proportion to decreases in $I_1$ and the voltage of the end 29 increases. In another embodiment, the adjusting circuit 34 can simply employ a variable resistor for adjusting the voltage at the second end 29 of the first resistor.

Due to the differences in components and manufacturing process, each displaying device would have different voltages at end 29 when mass production. This is undesirable because voltage at end 29 would affect the voltage at the control end 24 of the image signal amplifier 12, the amplification magnitude of the image signal amplifier 12, as well as the activation time of the brightness control circuit 16. Some displaying devices will activate the brightness control circuit 16 to early, when the brightness of the picture has not yet reached the predetermined value. This will degrade the performance of the display. Other displaying devices may activate the brightness control circuit 16 too late, when the brightness of the picture has been too far exceeding the predetermined value. This would damage the fluorescent material on the screen and other related circuits. To ensure that every displaying device activates the brightness control circuit 16 at the proper point when the predetermined value of screen brightness is reached, an adjusting circuit 34 is used in this invention to adjust the voltage of the end 29. This guarantees that each displaying device could activate its brightness control circuit at the proper point when screen brightness reaches the predetermined value.

The following is a simple representation of the method for using the adjusting circuit 34 to correctly control the activation time of the brightness control circuit 16:

1. Outputting an image signal from the computer corresponding to a small white image block at a specific position of the displaying device 10 (e.g., the size of the white image box could be 3×3 inches)
2. Detecting the brightness of the small white image block with a properly positioned brightness detector 50. (The area detected by the brightness detector 50 is substantially smaller than the area of white image to ensure that the detection of the brightness of the area is correct.)
3. Adjusting the contrast of the displaying device 10 so that the brightness of the white image area reaches a predetermined level, for example, 60 FL (Foot Lambert) (1 Foot Lambert equals to 0.2919 candle power/meter square). At this time, although the local area is bright, the screen as a whole is mostly dark so the average brightness is insufficient to activate the brightness control circuit 16.
4. Outputting a white image signal of the entire screen from the computer so that the displaying device 10 displays a white image in all areas. Since the average screen brightness is high, the brightness control circuit of the displaying device 10 would be activated. The brightness control circuit prevents further increases in brightness and fixes the screen brightness at a certain level. The brightness detected by the brightness detector 50 becomes the activation time of the brightness circuit of the displaying device 10.
5. Using the micro-controller 42 to control the duty cycle of the switch 36 so that the brightness detected by the brightness detector reaches a predetermined value. Then the displaying device 10 will be set up to activate the brightness control circuit 16 whenever this moment is reached.

In the prior art, the time the brightness control circuit 16 is activated varies based on differences in the characteristics of the image signal amplifier 12, cathode ray tube 14, flyback transformer 26, capacitor C1 and the resistor R1 of each displaying device. Using the above adjusting steps, all displaying devices 10 activate the brightness control circuit 16 when the average brightness of the image picture reaches a predetermined value.

Compared to the displaying device of the prior art, the displaying device 10 of the present invention uses a brightness control circuit 16 to adjust the relationship between the anode current and the amplification magnitude of the image signals. When the image signals from the computer are such that the screen brightness becomes too great, the anode current $I_2$ of the cathode ray tube will increase. The brightness control circuit 16 will detect this change and send a signal to reduce the amplification magnitude of the image signal amplifier to protect the screen 18 from the electron beam and protect other related circuits from damage caused by an excessive average anode current. The present invention further comprises an adjusting circuit 34 so that the production line can either use manpower or be automated. In any case, the activation time of the brightness control circuit 16 can be precisely adjusted.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method for adjusting the brightness of a displaying device, the displaying device comprising:

an image signal amplifier for amplifying incoming image signals;

a cathode ray tube comprising a screen at its front end, an electron gun at its rear end for projecting and controlling an electron beam according to the amplified image signals onto the screen to create an image picture, and an anode for collecting the electron beam emitted onto the screen to produce an anode current; and a brightness control circuit electrically connected to a control end of the image signal amplifier for controlling the amplification magnitude of the image signal amplifier and electrically connected with the anode of the cathode ray tube via a flyback transformer which is used for providing the anode with the anode current wherein when the incoming image signals make the image picture shown on the screen too bright, the anode current of the anode will be increased accordingly, and the brightness control circuit will reduce the amplification magnitude of the image signal amplifier at the same time according to the increase of the anode current so as to reduce the anode current, and wherein the brightness control circuit comprises an adjusting circuit electrically connected with the control end of the image signal amplifier for adjusting the brightness of the image picture of the screen;

the method comprising:

using a brightness detector to detect the brightness of the image picture of the screen, and using the adjusting circuit to adjust the brightness of the image picture until the brightness detected by the brightness detector reaches a predetermined brightness value.

2. The method of claim 1 wherein the brightness control circuit comprises a first resistor having a first end and a second end, and a voltage source electrically connected with the first end of the first resistor wherein the flyback transformer and the control end of the image signal amplifier are electrically connected with the second end of the first resistor and wherein when the anode current of the anode is increased, the voltage at the second end of the first resistor will be reduced because of the increased anode current passing through the first resistor from the voltage source, and the amplification magnitude of the image signal amplifier will be reduced in the same time according to the reduction of the voltage at the second end of the first resistor.

3. The method of claim 2 wherein the brightness control circuit further comprises a noise filter electrically connected between the second end of the first resistor and a ground port for filtering electric noises contained in the anode current.

4. The method of claim 3 wherein the noise filter is a capacitor.

5. The method of claim 2 wherein the adjusting circuit is electrically connected between the second end of the first resistor and a ground port for adjusting the voltage at the second end of the first resistor.

6. The method of claim 5 wherein the adjusting circuit employs a variable resistor for adjusting the voltage at the second end of the first resistor.

7. The method of claim 5 wherein the adjusting circuit comprises a switch and a second resister connected in series and the switch and second resistor are connected between the second end of the first resistor and the ground port, and the adjusting circuit further comprises a micro-controller for controlling on-and-off of the switch using a pulse-width-modulation method to adjust the voltage at the second end of the first resistor.

8. A displaying device comprising:

an image signal amplifier for amplifying incoming image signals;

a cathode ray tube comprising a screen at its front end, an electron gun at its rear end for projecting and controlling an electron beam according to the amplified image signals onto the screen to create an image picture, and an anode for collecting the electron beam emitted onto the screen to produce an anode current; and a brightness control circuit electrically connected with a control end of the image signal amplifier for controlling the amplification magnitude of the image signal amplifier and electrically connected with the anode of the cathode ray tube via a flyback transformer which is used for providing the anode with the anode current;

wherein the brightness control circuit comprises a first resistor having a first end and a second end and a voltage source electrically connected with the first end of the first resistor wherein the flyback transformer and the control end of the image signal amplifier are electrically connected with the second end of the first resistor and wherein when the incoming image signals make the image picture shown on the screen too bright, the anode current of the anode will be increased accordingly, and the brightness control circuit will reduce the amplification magnitude of the image signal amplifier at the same time according to the increase of the anode current so as to reduce the anode current.

9. The displaying device of claim 8 wherein the brightness control circuit comprises an adjusting circuit electrically connected between the second end of the first resistor and a ground port for adjusting the voltage at the second end of the first resistor.

10. The displaying device of claim 9 wherein the adjusting circuit comprises a variable resistor for adjusting the voltage at the second end of the first resistor.

11. The displaying device of claim 9 wherein the adjusting circuit comprises a switch and a second resister connected in series and the switch and second resistor are connected between the second end of the first resistor and the ground port, and the adjusting circuit further comprises a micro-controller for controlling the on-and-off of the switch by using a pulse-width-modulation method to adjust the voltage at the second end of the first resistor.

12. The displaying device of claim 8 wherein the brightness control circuit further comprises a noise filter electrically connected between the second end of the first resistor and a ground port for filtering electric noises contained in the anode current.

13. The displaying device of claim 12 wherein the noise filter is a capacitor.

* * * * *